US012737300B2

(12) United States Patent
Galles et al.

(10) Patent No.: US 12,737,300 B2
(45) Date of Patent: Sep. 15, 2026

(54) PROGRAMMABLE, SCALABLE, AND PERFORMANT VIRTUAL-TO-PHYSICAL ADDRESS TRANSLATION FOR REMOTE DIRECT MEMORY ACCESS (RDMA) AND OTHER PROTOCOLS

(71) Applicant: Advanced Micro Devices, Inc., Santa Clara, CA (US)

(72) Inventors: Michael Brian Galles, Los Altos, CA (US); Allen Hubbe, Durham, NC (US); Balakrishnan Raman, Santa Clara, CA (US); Saad Paya, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/680,998

(22) Filed: May 31, 2024

(65) Prior Publication Data

US 2025/0370936 A1 Dec. 4, 2025

(51) Int. Cl.
*G06F 12/1009* (2016.01)
*G06F 12/1036* (2016.01)
*G06F 15/173* (2006.01)

(52) U.S. Cl.
CPC ...... *G06F 12/1009* (2013.01); *G06F 12/1036* (2013.01); *G06F 15/17331* (2013.01)

(58) Field of Classification Search
CPC ............. G06F 12/1009; G06F 12/1036; G06F 12/17331
See application file for complete search history.

(56) References Cited

U.S. PATENT DOCUMENTS 5,715,418 A * 2/1998 Atsatt .................. G06F 3/0676 711/202
10,083,124 B1 * 9/2018 Brandt ................ G06F 12/1009
2012/0303948 A1 * 11/2012 Auernhammer ...... H04L 9/3247 713/150
2013/0067193 A1 * 3/2013 Kagan ................ G06F 12/1081 711/206

(Continued)

*Primary Examiner* — Ryan Bertram
(74) *Attorney, Agent, or Firm* — Patterson + Sheridan, LLP

(57) ABSTRACT

Embodiments herein describe programmable, scalable, and performant virtual-to-physical address translation for remote direct memory access (RDMA) and other protocols. A discrete-logic virtual address-to-physical address (VA2PA) circuit translates addresses based on table lookups. Multiple instances of the VA2PA circuit may be distributed amongst stages of a pipeline to translate addresses for the respective stages, independent of one another. The VA2PA circuit may translate addresses based on multiple translation modes, which may be specified in opcodes of memory access requests. Based on the opcodes, the VA2PA circuit may translate, fetch, and/or probe virtual address translation structures, and may provide translation services specific to remote direct memory access (RDMA) devices. The discrete-logic of the VA2PA circuits provide relatively low latency, while the lookup tables and opcodes provide software-like flexibility/adaptability. The software-like flexibility/adaptability may be useful to support various translations options (e.g., modes/protocols), translation points within a pipeline, and/or to adapt to future protocols/concepts.

18 Claims, 4 Drawing Sheets

(56) References Cited

U.S. PATENT DOCUMENTS

| | | | | |
|---|---|---|---|---|
| 2015/0106804 | A1* | 4/2015 | Chandrashekhar ..... | G06F 9/455<br>718/1 |
| 2015/0178220 | A1* | 6/2015 | Grubisic ............ | G06F 12/1027<br>711/202 |
| 2020/0293454 | A1* | 9/2020 | Yokoyama ........... | G06F 3/0656 |
| 2025/0028648 | A1* | 1/2025 | Marcovitch ......... | G06F 12/1072 |

* cited by examiner

152

| LIF ID 202 | Translation Key 204 | KT_base 206 | VA 208 | Opcode 210 | Translation En 212 |
| --- | --- | --- | --- | --- | --- |

PROGRAMMABLE, SCALABLE, AND PERFORMANT VIRTUAL-TO-PHYSICAL ADDRESS TRANSLATION FOR REMOTE DIRECT MEMORY ACCESS (RDMA) AND OTHER PROTOCOLS

TECHNICAL FIELD

Examples of the present disclosure generally relate to programmable, scalable, and performant virtual-to-physical address translation for remote direct memory access (RDMA) and other protocols.

BACKGROUND

Remote direct memory access (RDMA) device drivers operate in a virtual address space. User-level programs post commands to an RDMA device using virtual addresses pointers to memory, describing data structures to send or receive. The RDMA devices translates the virtual addresses to physical addresses so that the memory reads and writes can be issued to physical address space. In some situations, the user-level programs execute in a virtual address space, and virtual address mappings are maintained in hardware-based memory management unit (MMU). MMUs are generally not scalable, performant, or compatible with programmable processing pipelines, such as pipelines programmed based the P4 programming language.

SUMMARY

Techniques for programmable, scalable, and performant virtual-to-physical address translation for remote direct memory access (RDMA) and other protocols are described. One example is an integrated circuit device that includes a processing pipeline having multiple processing stages that include respective discrete-logic address translation circuits that convert virtual addresses to physical addresses based on table lookups.

Another example described herein is a network interface controller that has multiple processing pipelines, including a transmit-side processing pipeline and a receive-side processing pipeline, where the processing pipelines include multiple data processing stages having respective discrete logic translation circuits that convert virtual addresses to physical addresses based on table lookups.

Another example described herein is an integrated circuit based distributed services platform that includes a networking portion and a system-on-chip (SoC) portion. The SoC portion includes a host interface, a memory controller, an offload engine, a processor, and an interconnect that interfaces with the host interface, the memory controller, the offload engine, the processor, and the networking portion. The networking portion includes a processing pipeline having multiple data processing stages that include respective discrete logic translation circuits to convert virtual addresses to physical addresses based on table lookups.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figures 1, 2:
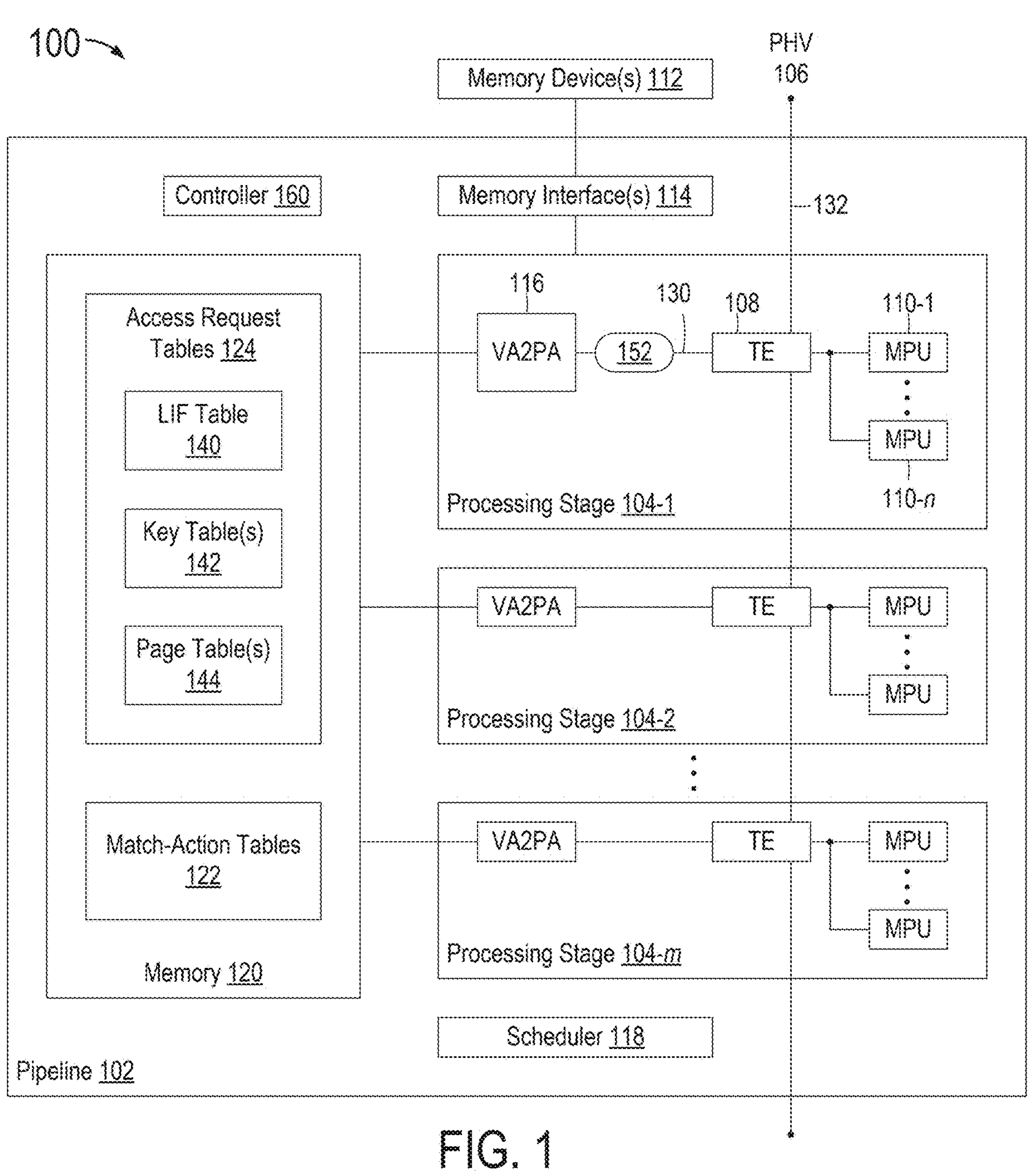
FIG. 1 is a block diagram of a system that includes a processing pipeline, according to an embodiment.
FIG. 2 illustrates an example access request, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe programmable, scalable, and performant virtual-to-physical address translation for remote direct memory access (RDMA) and other protocols.

As described further above, virtual address mappings may be maintained in hardware-based memory management unit (MMU), which are generally not scalable, performant, or compatible with programmable processing pipelines.

An alternative is a software-based approach in which addresses are translated by instruction processors of the pipeline. In order to traverse a tree data structure of a page table, however, several dependent read operations may need to performed by multiple corresponding stages of the processing pipeline, which leaves fewer processing stages for other operations. To compensate, multiple passes through the pipeline may be performed, and/or additional stages may be added to the pipeline. Both options increase software complexity and pipeline latency. The latter option adds significant design/manufacturing costs and delays.

Disclosed herein is a discrete-logic virtual address-to-physical address (VA2PA) circuit that translates addresses based on lookup tables. Multiple instances of the VA2PA circuit may be distributed amongst stages of a pipeline to translate addresses for the respective stages, independent of one another. The VA2PA circuit may translate addresses based on multiple translation modes, which may specified in operational code of memory access requests. Based on the opcodes, the VA2PA circuit may translate, fetch, and/or probe virtual address translation structures, and may provide translation services specific to remote direct memory access (RDMA) devices.

The discrete-logic of the VA2PA circuits provide relatively low latency, while the table lookups and opcodes provide software-like flexibility/adaptability. The software-like flexibility/adaptability may be useful to support various translations options (e.g., modes/protocols), translation points within a pipeline, and/or to adapt to future protocols/concepts.

With opcodes and lookup tables, the VA2PA circuit provides address translation services in a way that is scalable, performant, and compatible with programmable pipelines. The VA2PA circuit is performant in that multiple instances may be distributed across all stages of a processing pipeline. The VA2PA circuit is scalable in that translation tables are based in dynamic memory. The VA2PA circuit is flexible in that it can map many memory keys per logical interface, with multiple keys mapping to multiple page tables, supporting variable page sizes and multiple page levels per key.

The VA2PA circuit may efficiently perform dependent reads of a page table for a table engine (TE) of a corresponding stage of the pipeline, perform translation table lookups for several data objects (e.g., packet header vectors) in parallel, which may increase pipeline throughput, and may cache results in a translation lookaside buffer in the same stage.

The VA2PA circuit may operate seamlessly with a P4DMA program. A P4DMA program can choose where to do translations within a pipeline and can choose to do translations in multiple stages. The type of translation is also programmable and allows software to choose operations performed by the VA2PA circuit, which may be useful to adapt to evolving protocols. Distributing VA2PA functions across pipeline stages allows performance to scale with the number of pipeline stages. Distributing VA2PA functions across pipeline stages also reduces latency, as translation occurs closer to the execution stage. Distributing VA2PA functions across pipeline stages also permits TLBs to have functional locality, in that translations are cached only for functions of the corresponding pipeline stage.

Further regarding MMUs, a MMU may not support opcode functionality (e.g., probe commands). As a singled shared resource, an MMU may not support the full parallelism of the programmable pipelines. Integrating a MMU to work with table engines (TEs) of multiple pipeline stages also poses technical challenges.

FIG. 1 is a block diagram of a system 100 that includes a processing pipeline (pipeline) 102, according to an embodiment. System 100 may represent a network interface device (NIC), a system-on-chip (SoC), and/or a distributed services platform, which may include a NIC and a SoC, examples of which are provided further below. System 100 is not, however, limited to the foregoing examples. System 100 may include one or more integrated circuit (IC) devices.

In the example of FIG. 1, pipeline 102 includes processing stages 104-1 through **104-*m* (collectively, processing stages 104), and memory 120. Processing stages 104 process incoming data based on parameters encoded within memory 120. In the example of FIG. 1, the incoming data is illustrated as a packet header vector (PHV) 106. PHV 106 may include data related to an incoming packet received from a network or data related to an outgoing packet to be transmitted over the network. Processing stages 104 may process PHV 106 in a sequential/pipeline manner. The input data is not, however, limited to packet-related data. Processing stage 104-1 is described below. Processing stages 104-2 through 104-*m* may be similar or identical to processing stage 104-1**.

Processing stage 104-1 includes one or more instruction processors, illustrated here as match-processing units (MPUs) 110-1 through **110-*n* (collectively, MPUs 110). Processing stage 104-1 further includes a discrete-logic match-action circuit, illustrated here as a table engine (TE) 108, that identifies one more match-action tables 122 based on PHV 106. TE 108** may include combinational logic and/or synchronous logic.

Match-action tables 122 may include input parameters that specify data that TE 108 is to extract from a matching PHV, data to be provided to MPUs 110, and/or code/instructions to be provided to MPUs 110 for processing the data. One or more match-action tables 122 may be dedicated to a specific processing stage 104 and/or shared amongst multiple processing stages 104.

TE 108 may retrieve additional data for from one or more other sources based on input parameters of a match-action table 122, and may provide the additional data to MPUs 110. In an example, TE 108 sends an access request 152 to one or more memory devices, illustrated here as a memory device 112, via a memory interface 114. Memory device 112 may include, without limitation, a remote direct memory access (RDMA) memory device, and memory interface 114 may include a corresponding RDMA engine.

Pipeline 102 further includes a discrete-logic translation circuit, illustrated here as a virtual address-to-physical address (VA2PA) circuit 116 that intercepts and processes access request 152 based on table lookups. VA2PA circuit 116 may include combinational logic and/or synchronous logic. VA2PA circuit 116 may translate a virtual address of access request 152 to a physical address based on one or more translation modes specified by operational code (opcode) within access request 152. As an example, VA2PA circuit 116 may provide RDMA memory region translation services and/or generic virtual address translation services, examples of which are provided further below. The VA2PA circuits of processing stages 104 may operate independent of one another.

TE 108 may construct access request 152 as a table data vector and/or other data object. FIG. 2 illustrates an example access request 152, according to an embodiment. In the example of FIG. 2, access request 152 includes a logical interface identifier (LIF ID) 202, a translation key 204, a virtual address (VA) 208, operational code (opcode) 210, and a translation enable bit 212. Translation key 204 may represent a root of a page table, and may be used to identify a key table entry (KTE), such as described further below. Access request 152 may include additional fields and/or may omit one or more of the foregoing fields.

VA2PA circuit 116 may modify access request 152 with a physical address and/or other information, and may forward the modified access request to memory device 112 via memory interface 114. VA2PA circuit 116 may also receive a response from memory device 112 via memory interface 114, and provide the response to TE 108-1. TE 108 may send access request 152 to VA2PA circuit 116 during a "match" part of the match-action process described above.

TE 103 processes access request 152 based on table lookups directed to access request tables 124. In the example of FIG. 1, access request tables 124 include logical interface (LIF) tables 140, key tables 142, and page tables 144. Access request tables 124 may be dedicated to specific processing stages 104 and/or may be shared amongst the processing stages 104.

LIF table 140 may be indexed by LIF IDs, and may include an entry for each of multiple logical interfaces, which may include information regarding key tables 142 of the logical interface. A LIF may be bound to a virtual function (VF) or a physical function (PF) as defined in a PCIe SR-IOV standard.

The logical interfaces may have respective namespaces of keys (e.g., LIF ID_A, key 1, is not the same as LIF ID_B, key 3). A logical interface may have more than one namespace of translation keys. As an example, a logical interface may have a first namespace of keys for RDMA memory regions, and a second namespace of translation keys for translating addresses for descriptor rings. Opcode 210 may determine which namespace of keys is used for address transformation. Not all logical interface are required to support VA2PA circuit 116. It can be on a per logical interface basis, for no logical interface, some logical interfaces, or all of the logical interfaces.

A key table 142 may be indexed by translation keys of a single namespace, and may include a key table (KTE) for each translation key. A KTE may include information regarding a memory region identified by the translation key, and information regarding a page table 144 for the memory region. A KTE may further include information for circuitry other than VA2PA circuit 116, such as information for use by MPUs 110 when executing MPE code/instructions, and/or code/instructions for execution by MPUs 110. KTEs may be bound to a local key (LKEY) or a remote key (RKEY). KTEs are not, however, limited to the foregoing examples.

Page tables 144 contain physical addresses of memory device(s) 112. A page table 144 may include multiple levels of page directory entries (PDEs) of page table entries (PTEs), indexed by an address offset. Examples are provided further below with reference to FIG. 3. Layouts of page tables 144 may vary based on a translation mode and page size. Translation modes are described further below.

Pipeline 102 may further include a scheduler 118 that schedules processing activities of MPUs of processing stages 104.

The VA2PA circuits of processing stages 104 may include respective registers, which may be useful for configuring the corresponding VA2PA circuits. The VA2PA circuits may be configurable for debugging purposes and/or to alter behavior, examples of which are provided below.

The VA2PA circuits of processing stages 104 may include respective memory or cache, which the VA2PA circuits may use as translation look-aside buffers (TLBs) for caching access request tables 124 (e.g., page tables). The TLBs may be invalidated by cache coherency protocols when page tables are updated. The TLBs may be controllable via the above-described registers. In an example, TLBs may be enabled, disabled, and/or cleared via the registers. In another example, different translation modes may be controlled for cache coherency. In another example, different translation modes may be controlled for a behavior of the corresponding VA2PA circuit and TLB with respect to relatively large pages. Keys and page translations stored in TLBs of each VA2PA instance will reflect the common references of a given pipeline stage, providing functional cache locality of translations for a given functional stage.

TE 108 and VA2PA circuit 116 may communicate with one another over an internal bus 130. Processing stages 104 may process PHV over a pipeline bus 132. Internal bus 130 and/or pipeline bus 132 may be based on an Advanced extensible Interface (AXI) bus protocol (e.g., VA2PA circuit 116 may serve as an in-line AXI component).

Figure 3:
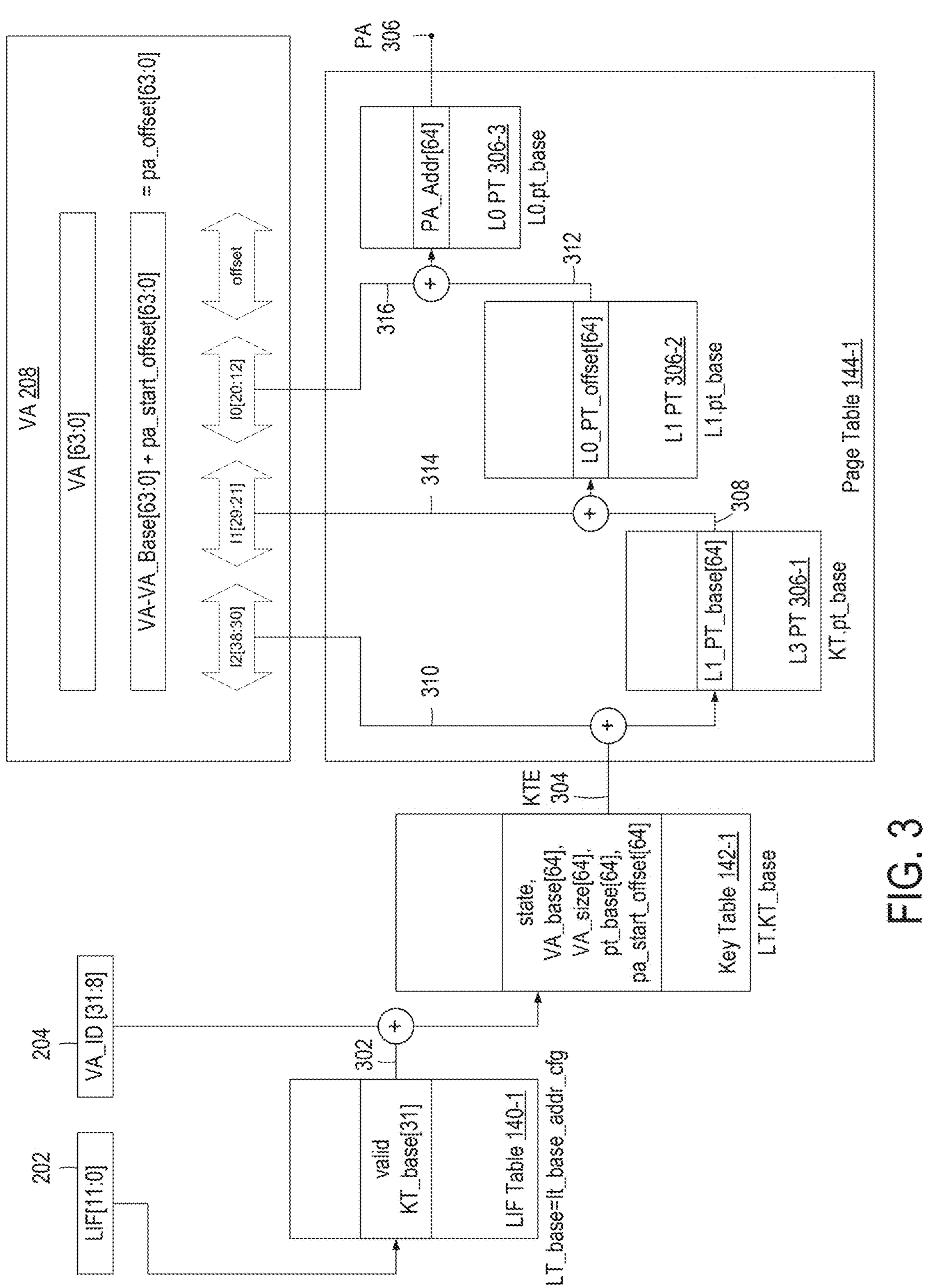
FIG. 3 illustrates an example address translation by a virtual address-to-physical address (VA2PA) circuit, according to an embodiment.
Figure 4:
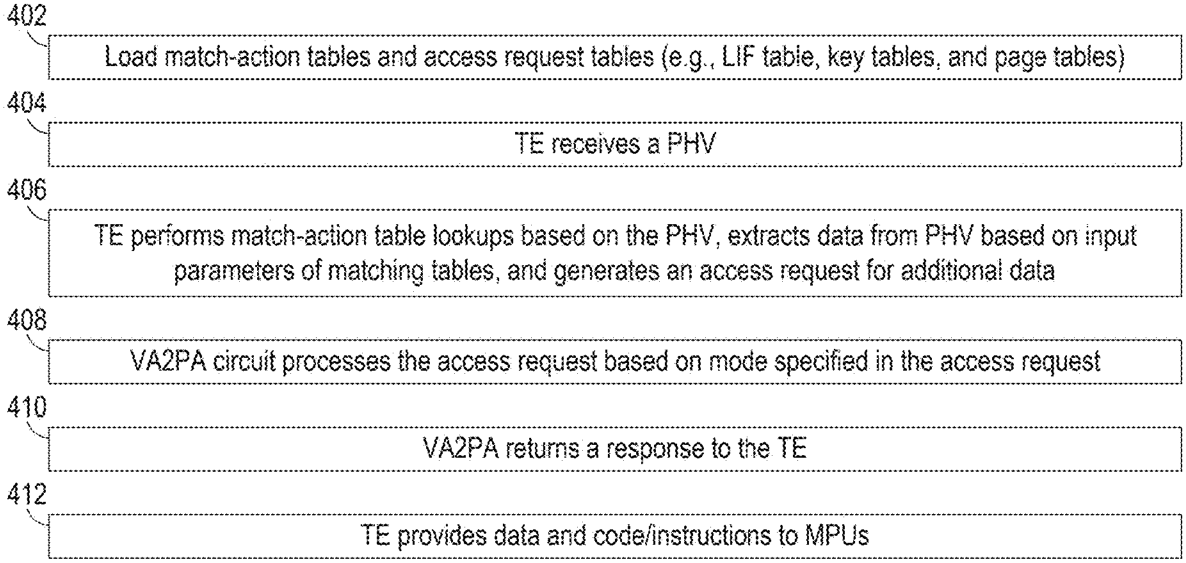
FIG. 4 illustrates a method, according to an embodiment.

FIG. 3 illustrates an example address translation by VA2PA circuit 116, according to an embodiment. FIG. 3 is described below with reference to FIG. 4. FIG. 4 illustrates a method 400, according to an embodiment. Method 400 is described below with reference to FIGS. 1-3. Method 400 is not, however, limited to the examples of FIGS. 1-3.

At 402, a controller 160 loads match-action tables 122 and access request tables 124 with data, parameters, and/or instructions. Controller 160 may be part of system 100 and/or an external controller. Controller 160 may load match-action tables 122 and access request tables 124 when power is applied to system 100.

At 404, TE 108 receives PHV 106 over bus 132. PHV 106 may include, for example and without limitation, LIF ID 202, translation key 204, KT-base 206, VA 208, opcode 210, payload/data, and/or other data and/or parameters.

At 406, TE 108 reads read match-action tables 122, identifies one or more of match-action tables 122 that match PHV 106, extracts data from PHV 106 based on input parameters of the matching match-action tables, constructs access request 152 to gather additional information based on the input parameters of the matching tables and/or based on the data extracted from PHV 106. TE 108 may also retrieve code/instructions for MPUs 110 from the matching tables.

At 408, VA2PA circuit 116 receives and processes access request 152. VA2PA circuit 116 may process access request 152 based one on or more of multiple translation modes, which may be specified by opcode 210.

The translation modes may include a memory region (MR) mode for remote direct memory address (RDMA) memory regions of a RDMA memory device 112. An MR mode may be useful to account for RDMA-specific parameters (e.g., alignment, bounds checking, and/or other validation methods), and/or to account for RDMA-specific types of information returned from the remote memory device (e.g., in response to a probe).

The translation modes may include a translate only (TO) mode for generic memory translations (i.e., for non-RDMA memory regions). In the TO mode, VA2PA circuit 116 translates a virtual address to a physical address, reads contents of the physical address, and returns the contents of the physical address. The TO mode may be useful for fetching descriptors for work requests, and/or for probing a physical address (e.g., in preparation for writing a completion descriptor).

In the MR mode and/or the TO mode, VA2PA circuit 116 may translate VA 208 to a physical address, and may further load a table data vector from the physical address. VA2PA circuit 116 may use mode-specific parameters based on opcode 210. VA2PA circuit 116 may, for example, use different namespaces for keys, such as a MR L_Key index and R_Key index for MR mode, and a queue number for TO mode.

The translation modes may include a probe mode in which VA2PA circuit 116 translates a virtual address to a physical address and returns the physical address, without reading contents of the physical address (i.e., returns the physical address but not the table contents). VA2PA circuit 116 may return one or more physical addresses corresponding to a contiguous virtual address region.

In the probe mode, VA2PA circuit 116 may returns a KTE, or a portion thereof, from a key table 142 to TE 116, with or without a translated physical address. As described further above, the KTE may include information formatted for VA2PA circuit 116, and information that can be used by MPUs. A probe response may contain a portion of the KTE formatted for VA2PA circuit 116, and/or a portion of the KTE for use by MPUs. A probe response may also include derived information, such as a status of a corresponding translation, information about a failure of the corresponding translation, and/or other information. A probe response may include multiple physical addresses, the number of which may vary based on opcode 210 and/or based on a type and/or size of a memory region. One or more opcodes may specify a limit on the number of physical addresses to be returned. The format of a probe response may be based on one or more of a variety of factors, which may relate to a memory region (e.g., contiguous or dis-contiguous), and/or a translation mode.

The translation modes may include a "key probe and set busy" mode in which VA2PA circuit 116 returns a key table entry (KTE) to TE 116 (e.g., without translating VA 208 to a physical address), and in which VA2PA circuit 116 and/or controller 160 locks the KTE (e.g., to preclude access to the KTE by VA2PA circuitry of other processing stages 104). While the KTE is locked, VA2PA circuit 116 and/or controller 160 may perform an atomic update to one or more fields of the KTE. VA2PA circuit 116 and/or controller 160 may also determine if the atomic update was successful (e.g., to synchronize updates to the KTE). Controller 160 may also modify another field of the KTE. Controller 160 may, for example, modify a field impacted by the atomic update, such as to alter behavior of a subsequent command directed to the KTE.

VA2PA circuit 116 may support a no translation opcode, for which VA2PA circuit 116 will forward an address contained within access request 152 as a physical address as-is, without modification or virtual-to-physical address translation (i.e., equivalent to implementing a P4DMA raw table without translating VA 208 to a physical address). The no translate mode may be useful in situations where a physical address is available (e.g., previously translated).

An example in which VA2PA circuit 116 processes access request 152 in a MR mode is described below with reference to FIG. 3 (i.e., an example in which access request 152 is directed to a RDMA region). In FIG. 3, VA2PA circuit 116 fetches a LIF table entry 302 from a LIF table 140-1 based on LIF ID 202. VA2PA circuit 116 then fetches a key table entry (KTE) 304 from a key table 142-1 based on LIF table entry 302, translation key 204, and KT_base 306.

VA2PA circuit 116 then fetches a physical address (PA) 306 from a page table 144-1 based on KTE 304 and VA 208. In the example of FIG. 3, VA2PA circuit 116 fetches a first page table entry (PTE) 308 from a page directory entry (PDE) 306-1 based on KTE 304 and a first portion 310 of VA 208. VA2PA circuit 116 fetches a second PTE 312 from a second PDE 306-2 based on PTE 308 and a second portion 314 of VA 208. VA2PA circuit 116 fetches physical address 306 from a third PDE 306-3 based on PTE 312 and a third portion 316 of VA 208.

In the example of FIG. 3, page table 144-1 includes three PDE levels. The example of FIG. 3 also includes example bit positions for illustrative purposes. VA2PA circuit 116 is not limited to the examples of FIG. 3.

Further in the example of FIG. 3, processing of the access request includes a sequence of LIF processing, key processing, and table processing. In other examples (e.g., for a no translation opcode), processing of an access request may involve fewer functions.

An offset of a virtual address from a nearest (e.g., less than or equal) page-aligned virtual address may be equal to an offset of a corresponding physical address to a nearest page-aligned physical address. In an embodiment, VA2PA circuit 116 supports an applications/situations in which virtual addresses and physical addresses have different alignments within a page size.

Different regions a memory device 112 may share the same page table entries, if they are backed by the same physical pages. The memory regions may be identified by different translation keys, and may have arbitrarily different base virtual addresses, sizes, and/or offsets in the page table.

VA2PA circuit 116 may support sparse and dynamic page tables, where not all virtual addresses have a valid physical address at all times. VA2PA circuit 116 may recognize an invalid address and issue an error response. Controller 160 may implement page faults using this mechanism to dynamically assign a physical address for the virtual address in the page table. VA2PA circuit 116 may than repeat the failed opcode 210. Controller 160 may provide additional services, such as PCI address translation services, and may store system physical address information from a PCI ATS response directly in page tables 144.

At 410 (FIG. 4), VA2PA circuit 116 provides a response to TE 108. Contents of the response may vary based on the translation mode. The response may include, for example, date retrieved from a translated physical address of a memory device 112 and/or information regarding a memory region determined from access request 152 (e.g., with or without a translated physical address). Where TE 108 provides access request 152 as a table data vector, VA2PA circuit 116 may loads the response in the table data vector and return the table data vector to TE 108.

At 412, TE 108 provides data and code/instructions for processing by MPUs 110. TE 108 may provide the data and code/instructions directly to one or more of MPUs 110. Alternatively, scheduler 118 may schedule the data and code/instructions for processing by one or more of MPUs 110.

As disclosed herein, discrete-logic address translation circuits (i.e., VA2PA circuits) may be distributed amongst multiple processing stages of a processing pipeline, and perform address translations for the respective processing stages based on table lookups and opcodes, independent of one another. The discrete-logic of the VA2PA circuits provide relatively low latency, while the table lookups and opcodes provide software-like flexibility/adaptability. The software-like flexibility/adaptability may be useful to support various translations options (e.g., modes/protocols), translation points within a pipeline, and/or to adapt to future protocols/concepts.

A VA2PA circuit may exchange relatively extensive/complex information (e.g., in the form of table data vectors) with a corresponding TE over a relatively wide, dedicated internal bus (e.g., internal bus 130), which permits greater flexibility with respect to types of translations (i.e., modes), and types/amounts of data returned to the TE, processes with little or no impact on other processing stages.

The VA2PA circuits may perform address translation services for multiple PHVs in parallel, which may increase pipeline throughput.

The VA2PA circuits may cache results in respective caches, and/or may cache tables in respective translation lookaside buffers, which may further reduce latency and improve efficiency.

Probe responses may be handled via software (i.e., a computer program executing on an instruction processor, such as controller 160). Handling probe responses in software means other parts of the system may not require virtual address translation. As an example, controller 160 may prepare a DMA command based on a translated physical address of a probe response generated by one of processing stages 104. Thereafter, address translation may not be needed in a DMA engine stage of pipeline 102.

Translation faults may also be handled via software, which permits use of dynamic page tables that may be updated via one or more of a variety of mechanisms, such as RDMA-on-demand paging, PCI Address Translation Services, and/or other mechanisms, individually and/or in combination with one another, without necessitating native support for the mechanisms in hardware.

Discrete-logic address translation circuits (i.e., VA2PA circuits) may be useful in a variety of applications including, without limitation, a network interface controller (NICs), a system-on-chip (SoC), and/or a distributed services platform. An example application is described below with reference to FIG. 5.

Figure 5:
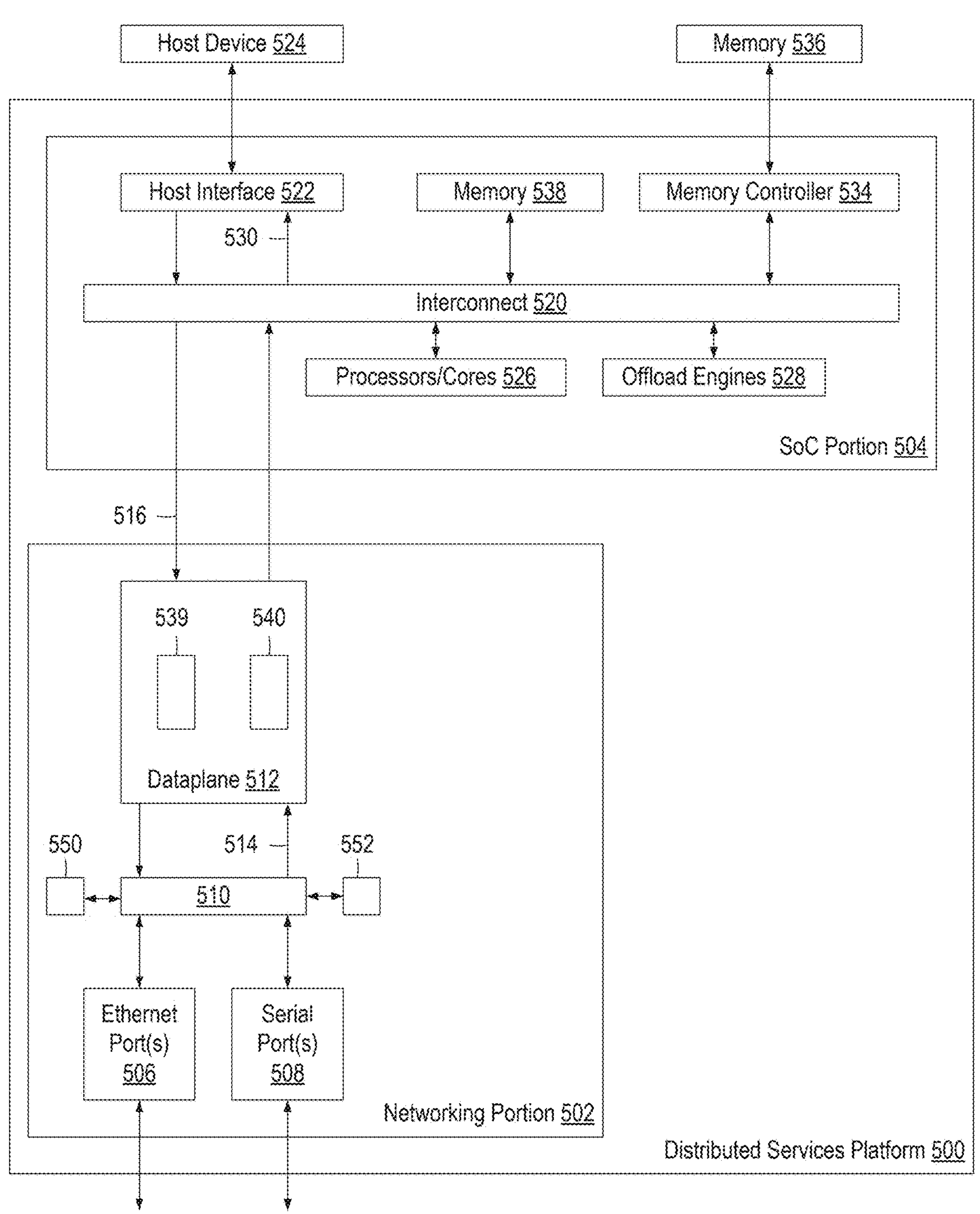
FIG. 5 is a block diagram of a distributed services platform, according to an embodiment.

FIG. 5 is a block diagram of a distributed services platform (platform) 500, according to an embodiment. Platform 500 may represent an integrated circuit (IC) device, which may include one or more IC dies and/or one or more circuit cards. In the example of FIG. 5, platform 500 includes a networking portion 502 and a system-on-chip (SoC) portion 504.

Networking portion 502 includes one or more packet-based ports, illustrated here as Ethernet port(s) 506. Networking portion 502 may further include one or more serial ports 508 (e.g., for sideband signaling). Serial port(s) 508 may operate in accordance with a Network Controller Sideband Interface (NC-SI) specification maintained by the Distributed Management Task Force, Inc., (DTMF).

Networking portion 502 further includes a packet processing dataplane (dataplane) 512 that processes incoming packets 514 from Ethernet port(s) 506, and data 516 from SoC portion 504 for outgoing packets. Dataplane 512 may include a transmit-side data processing pipeline 539 and a receive-side data processing pipeline 540.

Networking portion 502 further includes a packet buffer traffic manager 510 that steers packets between media access controllers (MACs) of Ethernet port(s) 506 and the data processing pipelines of dataplane 512. Networking portion 502 may further include a transmit-side packet processing pipeline 550 and a receive-side packet processing pipeline 552.

SoC portion 504 includes a host interface 522 that interfaces with a host device 524. Host interface 522 may include a media access controller (MAC) that operates in accordance with a peripheral component interconnect express (PCIe) standard managed by the Peripheral Component Interconnect Special Interest Group (PCI-SIG) of Beaverton, OR. Host interface 522 may present itself to host device 524 as a PCIe device on a PCIe bus, such as an Ethernet network interface controller (NIC), a non-volatile memory express (NVMe) storage device, and/or other device(s). Host interface 522 may include multiple PCIe lanes that may connect to other devices. As an example, host interface 522 may be configured as a PCIe root complex, and the PCIe lanes may connect to multiple host devices and/or multiple NVMe drives.

SoC portion 504 further includes one or more processors or processor cores (processors) 526. Processors 526 may include, without limitation, reduced-instruction set computer (RISC) processors, such as ARM processors marketed by Arm Holdings plc, of Cambridge, England. Processors 526 may perform connection/session setup functions, tear down functions, and/or other functions.

SoC portion 504 further includes one or more offload engines 528. Offload engine(s) 528 may perform one or more of a variety of functions. As examples, and without limitation, offload engine(s) 528 may include a cryptographic engine and/or an error detection and/or error correction engine. Offload engines 528 may operate based on hardware queues that are controlled by pipelines 539 and 540 and/or processors 526. Coherent caches of processors 526 may be coupled with DMA engines of pipelines 539 and 540.

Networking portion 502 and/or SoC portion 504 may further include memory and/or a memory controller. In the example of FIG. 5, platform 500 includes a memory controller 534 that accesses external memory 536. Platform 500 further includes memory 538, which may include tertiary content-addressable memory (TCAM), processor cache, random-access memory (RAM), static RAM (SRAM), and/or other memory.

SoC portion 504 further includes an interconnect 520, which may include a coherent interconnect such as a packet-based network-on-chip (NoC). Interconnect 520 may connect pipelines 539 and 540 with offload engines 528, processors 527, PCIe devices (i.e., via host interface 522), memory 538, and/or memory 536 (i.e., via memory controller(s) 534).

One or more of pipelines 539, 540, 550, and 552 may include features described further above with respect to pipeline 102. One suitable programming language for pipelines 539, 540, 550, and 552 is the P4 programming language described in a P4Runtime Specification managed by the Open Networking Foundation (ONF) of Palo Alto, CA. The P4 programming language may be used to specify a dataplane of networking devices by combining a number of core abstractions, such as parsers, tables and externs. The abstractions instantiate pipeline objects, which may be managed at runtime to configure desired forwarding behavior. P4 object management may be useful, for example, to create and delete entries of match-action tables. However, the embodiments herein are not limited to any particular type of programming language.

Platform 500 may be configurable for a variety of applications including, without limitation, as a network interface controller (NIC), as a network node (e.g., a switch or router), and/or as an end-system connected to a network. Platform 500 may be useful for load balancing, networking, storage services, offloading, and/or other purposes/applications.

Another example is a network interface controller (NIC) that includes a transmit-side processing pipeline and a receive-side processing pipeline, where the transmit-side and receive-side processing pipelines include multiple processing stages that include respective discrete logic translation circuits that convert virtual addresses to physical addresses based on table lookups.

The discrete logic translation circuits may look-up up logical interface (LIF) keys based on LIF identifiers (LIF IDs) of memory access requests, look-up key table entries (KTEs) based on the LIF keys, translation keys of the memory access requests, and key table base addresses of the memory access requests, and look-up page table entries (PTE) based on the KTEs and virtual addresses of the memory access requests.

The processing stages may further include respective instruction processors and discrete logic match-action circuits that provide the memory access requests to the respective discrete logic translation circuits and to provide data and instructions to the respective instruction processors, based on parameters of match-action tables that match an input vector.

The discrete logic translation circuits may process memory access requests independent of one another, in accordance with one or more of multiple modes specified in operational codes of memory access requests of the respective processing stages. The modes may include a memory region mode in which the discrete logic translation circuits account for one or more of remote direct memory access (RDMA) specific parameters and RDMA-specific types of information returned from a RDMA device. The modes may include a translate-only mode in which the discrete logic translation circuits translate virtual addresses to physical address, read contents of the physical addresses, and return the contents of the physical address. The modes may include a probe mode in which the discrete logic translation circuits translate virtual addresses to physical address, and return the physical addresses without reading contents of the physical addresses. The modes may include a probe and set busy mode in which the discrete logic translation circuits retrieve key table entries (KTEs) without translating virtual addresses to physical addresses, and lock the corresponding KTEs for atomic updates of the KTEs. The modes may include a no translate mode in which the discrete logic translation circuits forward addresses of the memory access requests without translating the addresses of the memory access requests.

The discrete logic translation circuits may apply mode-specific parameters based on the operational codes, wherein the mode-specific parameters comprise mode-specific namespaces for the LIF keys.

The NIC may further include a processor and memory encoded with instructions that, when executed by the processor, cause the processor to encode the LIF tables with the LIF keys, encode key tables with the KTEs, and encode page tables with the PTEs.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC), comprising:

an instruction processor configured to processes data objects;

memory encoded with lookup tables;

translation logic configured to convert virtual addresses of memory access requests to physical addresses based on contents of the lookup tables and translation modes specified in operational codes of the memory access requests; and match-action logic configured to provide the memory access requests to the translation logic and to provide data and instructions to the instruction processor based on parameters of match-action tables that match features of the respective data objects.

2. The IC of claim 1, wherein the translation logic is further configured to:

look-up up logical interface (LIF) keys based on LIF identifiers (LIF IDs) of memory access requests;

look-up key table entries (KTEs) based on the LIF keys, translation keys of the memory access requests, and key table (KT) base addresses of the memory access requests; and look-up page table entries (PTE) based on the KTEs and virtual addresses of the memory access requests.

3. The IC of claim 1, wherein the translation modes comprise one or more of:

a memory region mode in which the translation logic accounts for one or more of remote direct memory access (RDMA) specific parameters and RDMA-specific types of information returned from a RDMA device;

a translate-only mode in which the translation logic translates virtual addresses to physical address, read contents of the physical addresses, and return the contents of the physical address;

a probe mode in which the translation logic translates virtual addresses to physical address, and returns the physical addresses without reading contents of the physical addresses;

a probe and set busy mode in which the translation logic retrieves key table entries (KTEs) without translating virtual addresses to physical addresses, and locks the corresponding KTEs for atomic updates of the KTEs; and a no translate mode in which the translation logic forwards addresses of the memory access requests without translating the addresses of the memory access requests.

4. The IC of claim 3, wherein the translation logic is further configured to:

apply mode-specific parameters based on the operational codes, wherein the mode- specific parameters comprise mode-specific namespaces for logical interface (LIF) keys.

5. The IC of claim 1, wherein the memory comprises instructions that, when executed by the processor, cause the processor to:

encode logical interface (LIF) tables with LIF keys;

encode key tables with key table entries (KTEs); and encode page tables with page table entries (PTEs).

6. An integrated circuit (IC), comprising:

a data processing pipeline configured to process a data object, wherein the data processing pipeline multiple processing stages and memory comprising a programmable access request table, and wherein a first one of the processing stages comprises:

memory access request construction logic configured to construct a memory access request to obtain additional data for the data object, wherein the memory access request comprises an operational code that specifies a translation mode for the memory access request;

first translation logic configured to retrieve translation data from the programmable access request table based on information contained in the memory access request, retrieves the additional data based on the translation mode and the translation data, and returns the additional data to the memory access request construction logic; and an instruction processor configured to process the data object based on the additional data.

7. The IC of claim 6, wherein the first processing stage further comprises match-action logic configured to provide the memory access request to the translation and to provide the additional data and instructions to the instruction processor, based on parameters of match-action tables entry that matches features of the data object.

8. The IC of claim 6, wherein a second one of the processing stages comprises second translation logic, and wherein the first and second translation logic are further configured to:

process memory access requests independent of one another, in accordance with one or more of multiple modes specified in operational codes of the corresponding memory access requests.

9. The IC of claim 8, wherein the translation modes comprise one or more of:

a memory region mode in which the first translation logic accounts for one or more of remote direct memory access (RDMA) specific parameters and RDMA-specific types of information returned from a RDMA device;

a translate-only mode in which the first translation logic translate virtual addresses to physical address, read contents of the physical addresses, and return the contents of the physical address;

a probe mode in which the first translation logic translate virtual addresses to physical address, and return the physical addresses without reading contents of the physical addresses;

a probe and set busy mode in which the first translation logic retrieve key translation entries (KTEs) without translating virtual addresses to physical addresses, and lock the corresponding KTEs for atomic updates of the KTEs; and a no translate mode in which the first translation logic forwards addresses of the memory access requests without translating the addresses of the memory access requests.

10. The IC of claim 9, wherein the first translation logic are further configured to:

apply mode-specific parameters based on the operational codes, wherein the mode-specific parameters comprise mode-specific namespaces for logical interface (LIF) keys.

11. The IC of claim 6, further comprising a controller configured to:

encode logical interface (LIF) tables with LIF keys;

encode key tables with key table entries (KTEs); and encode page tables with page table entries (PTEs).

12. A system, comprising:

a data processing pipeline comprising multiple processing stages, each processing stage comprising translation logic configured to retrieve information from a programmable access request table based on information contained in a memory access request, and perform one or more of the following based on a translation mode specified in an operational code of the memory access request:

translate a virtual address of the memory access request to a physical address based on the information retrieved from the programmable access request table, retrieve data based on the physical address, and provide the data in a response to the memory access request; and retrieve information regarding a memory region determined from the information retrieved from the programmable access request table, and provide the information regarding the memory region in the response to the memory access request.

13. The system of claim 12, wherein the processing stages further comprises:

respective instruction processor; and respective match-action logic configured to provide respective memory access requests to the respective translation logic and to provide data and instructions to the respective instruction processors, based on parameters of match-action tables that match features of the respective memory access requests.

14. The system of claim 12, wherein the translation modes comprise one or more of:

a memory region mode in which the translation logic accounts for one or more of remote direct memory access (RDMA) specific parameters and RDMA-specific types of information returned from a RDMA device;

a translate-only mode in which the translation logic translate virtual addresses to physical address, read contents of the physical addresses, and return the contents of the physical address;

a probe mode in which the translation logic translate virtual addresses to physical address, and return the physical addresses without reading contents of the physical addresses;

a probe and set busy mode in which the translation logic retrieve key translation entries (KTEs) without translating virtual addresses to physical addresses, and lock the corresponding KTEs for atomic updates of the KTEs; and a no translate mode in which the translation logic forwards addresses of the memory access requests without translating the addresses of the memory access requests.

15. The system of claim 14, wherein the translation logic is further configured to:

apply mode-specific parameters based on the operational codes, wherein the mode-specific parameters comprise mode-specific namespaces for logical interface (LIF) keys.

16. The system of claim 12, wherein the translation logic of the processing stages are further configured to process memory access requests independent of one another in accordance with one or more of multiple modes specified in the operational codes of the memory access requests.

17. The IC of claim 6, wherein the translation logic is further configured to:

look-up up logical interface (LIF) keys based on LIF identifiers (LIF IDs) of memory access requests;

look-up key table entries (KTEs) based on the LIF keys, translation keys of the memory access requests, and key table (KT) base addresses of the memory access requests; and look-up page table entries (PTE) based on the KTEs and virtual addresses of the memory access requests.

18. The system of claim 12, wherein the translation logic is further configured to:

look-up up logical interface (LIF) keys based on LIF identifiers (LIF IDs) of memory access requests;

look-up key table entries (KTEs) based on the LIF keys, translation keys of the memory access requests, and key table base addresses of the memory access requests; and look-up page table entries (PTE) based on the KTEs and virtual addresses of the memory access requests.

* * * * *